US008136860B2

(12) United States Patent
Wise et al.

(10) Patent No.: US 8,136,860 B2
(45) Date of Patent: Mar. 20, 2012

(54) REMOVABLE CARGO LINER

(75) Inventors: Ronald D. Wise, Old Hickory, TN (US);
Jeffrey S. Quinn, Brentwood, TN (US)

(73) Assignee: Bedrug, Inc., Old Hickory, TN (US)

( * ) Notice: Subject to any disclaimer, the term of this patent is extended or adjusted under 35 U.S.C. 154(b) by 0 days.

(21) Appl. No.: 12/610,540

(22) Filed: Nov. 2, 2009

(65) Prior Publication Data
US 2011/0101723 A1    May 5, 2011

(51) Int. Cl.
*B60R 13/01* (2006.01)
(52) U.S. Cl. ...................... 296/39.1; 296/39.2
(58) Field of Classification Search ............... 296/39.1, 296/39.2, 97.23
See application file for complete search history.

(56) References Cited

U.S. PATENT DOCUMENTS

| 3,669,817 | A | * | 6/1972 | McDevitt | 428/82 |
| 4,709,453 | A | * | 12/1987 | Harvey et al. | 24/442 |
| 4,751,764 | A | * | 6/1988 | Reuben | 16/8 |
| 4,822,658 | A | * | 4/1989 | Pacione | 428/95 |
| 4,829,627 | A | * | 5/1989 | Altus et al. | 16/4 |
| 4,921,742 | A | * | 5/1990 | Altus | 428/81 |
| 4,968,548 | A | * | 11/1990 | Gibson et al. | 428/95 |
| 5,806,909 | A | * | 9/1998 | Wise | 296/39.1 |
| 2007/0275207 | A1 | * | 11/2007 | Higgins et al. | 428/95 |
| 2010/0247846 | A1 | * | 9/2010 | Erickson | 428/99 |

* cited by examiner

*Primary Examiner* — Dennis Pedder
(74) *Attorney, Agent, or Firm* — Harness, Dickey & Pierce, P.L.C.

(57) ABSTRACT

A removable cargo liner for use in a cargo area. The removable cargo liner comprises a plurality of separate and distinct panels, wherein each of the plurality of panels has a multi-layer assembly having a lower layer defining one of a hook and a loop feature. The removable cargo liner further comprises a single-sided member connectable to the cargo area having one of a hook and a loop feature, and an optional double-sided intermediate member having a first portion and an opposing second portion.

13 Claims, 3 Drawing Sheets

REMOVABLE CARGO LINER

FIELD

The present disclosure relates to cargo liner assemblies for lining the surfaces of a cargo area of pickup trucks, vans, trailers, and the like, and, more particularly, relates to a removable cargo liner comprising separable front, back, side, and floor panels selectively attached to the cargo area using hook and loop fasteners.

BACKGROUND

This section provides background information related to the present disclosure which is not necessarily prior art.

Pickup trucks and cargo van have long been used for rugged and messy applications. These vehicles are often used to carry cargo that can permanently damage the cargo box of the vehicle. For instance, the transport of dirt, blocks, stones, parts, and other items can often mar, dent, or damage the painted surface of the cargo box. Consequently, in a short time the cargo box and the vehicle generally can look worn, abused, and mistreated. Moreover, if repair to the damage in the cargo box is not attended to, permanent corrosion can occur.

To overcome this problem, vehicle manufacturers and after-market suppliers began to supply owners with protective bed liners. These units generally comprised one-pieced structures composed of a plastic. The liner of this design is lowered into the vehicle cargo box and, because of its one-piece construction, forms a large, unitary barrier to protect the bed from scratches and rust.

However, these liners suffer from a variety of difficulties. For example, they are remarkably cumbersome and require an extensive amount of labor for installation and removal. Furthermore, the conventional bed liner is difficult to store when removed from the vehicle. As a practical matter, these liners often remain in the vehicle for as long as the owner owns it. Unfortunately, debris and moisture can often seep between the unitary liner and the cargo box through a seam formed therebetween or through small openings in the cargo box that can lead to scratches and corrosion that are difficult to notice with the liner in place. Still further, these conventional liners are surprisingly heavy, being composed of a high-density, heavy plastic. Finally, these liners are typically attached to the cargo box using fasteners requiring drilling of the cargo surface, thereby potentially leading to an increased likelihood of corrosion at the fastener location.

In an attempt to overcome these problems, some have resorted to spraying a liquid covering over the entirety of the cargo box surface to form a cured and hardened surface. Unfortunately, this cured and hardened surface is not removable and, thus, prevents the vehicle from being returned to its as-manufactured condition.

Solutions to some of these disadvantages have been found as illustrated in commonly-assigned U.S. Pat. Nos. 5,007,670 and 5,806,909, which are incorporated herein by reference. U.S. Pat. No. 5,007,670 teaches, among other things, a multi-layer, corrugated bed liner that is connectable to the floor portion of the cargo box via a hook and loop fastener system. Similarly, U.S. Pat. No. 5,806,909 teaches, among other things, a removable and separable bed liner system that is attached to each other via a zipper and coupled to the cargo box via a hook and loop fastener system. It should be appreciated from a reading of these patents that their described assembly, although removable, is unlikely to be removed due to the difficulty of the hook and loop fastener system and the presence of sealed and zippered corners (shown in U.S. Pat. No. 5,806,909).

Accordingly, it is desired to provide a bed liner system that is simple to install and remove that is particularly well suited for cargo box protection while maintaining a simple method of removal.

SUMMARY

This section provides a general summary of the disclosure, and is not a comprehensive disclosure of its full scope or all of its features.

According to the principles of the present teachings, a removable cargo liner is provided for use in a cargo area. The removable cargo liner comprises a plurality of separate and distinct panels, wherein each of the plurality of panels has a multi-layer assembly having a lower layer defining one of a hook and a loop feature. The removable cargo liner further comprises a single-sided member connectable to the cargo area having one of a hook and a loop feature, and a optional double-sided intermediate member having a first portion and an opposing second portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
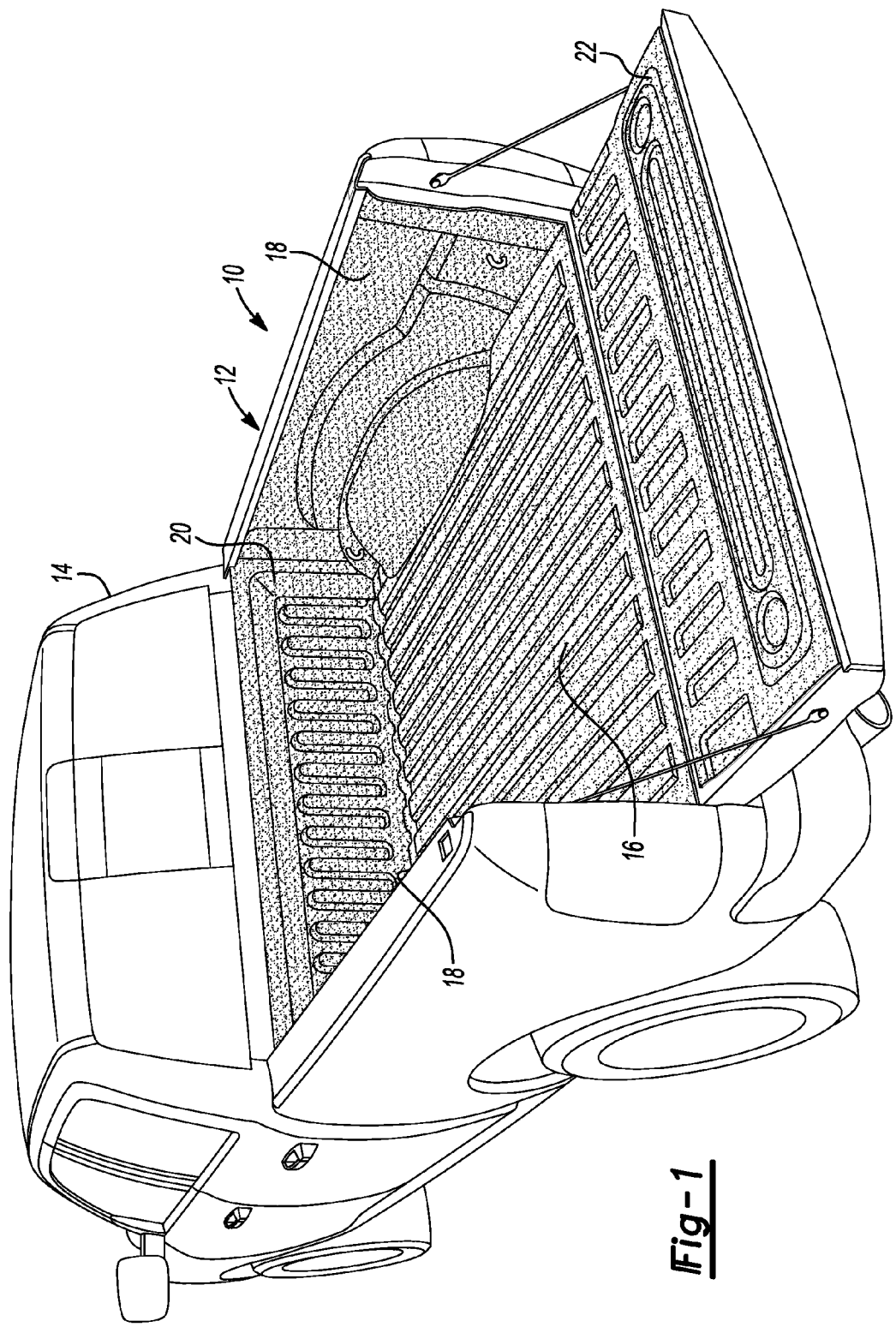
FIG. 1 is a perspective view illustrating a vehicle employing the removable cargo liner according to the principles of the present teachings.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an"

and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring first to FIG. 1, a perspective view of the removable cargo liner, generally illustrated as 10, attached to the cargo box 12 of a vehicle 14 is illustrated. While a pickup truck is shown, it is to be understood that removable cargo liner 10 of the present invention may be applied to the cargo box or area of virtually any vehicle, such as a van or a multi-utility vehicle, and/or trailer. Accordingly, the pickup truck 14 is used here for illustrative purposes only.

Figure 2:
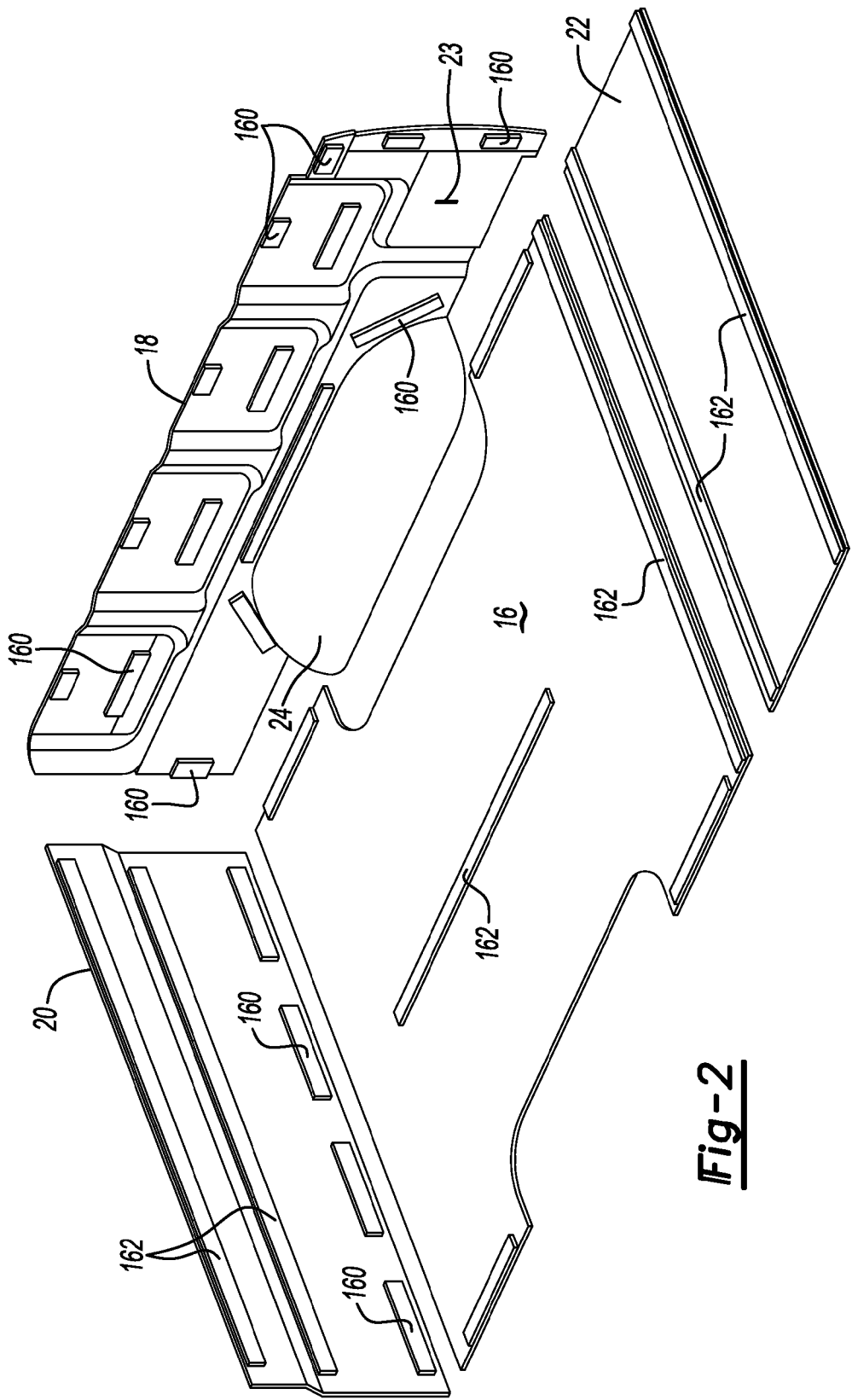
FIG. 2 is a schematic perspective view illustrating the removable cargo liner according to the principles of the present teachings with the near sidewall removed for clarity.

Referring now to FIGS. 1 and 2, in some embodiments, removable cargo liner 10 comprises a series of panels, including a base panel 16, a pair of side panels 18, 18', a front panel 20, and an optional rear panel 22. The base panel 16, the side panels 18, 18', the front panel 20, and the rear panel 22 are selectively removable from cargo box 12 and can be used in various combinations.

Figure 3:
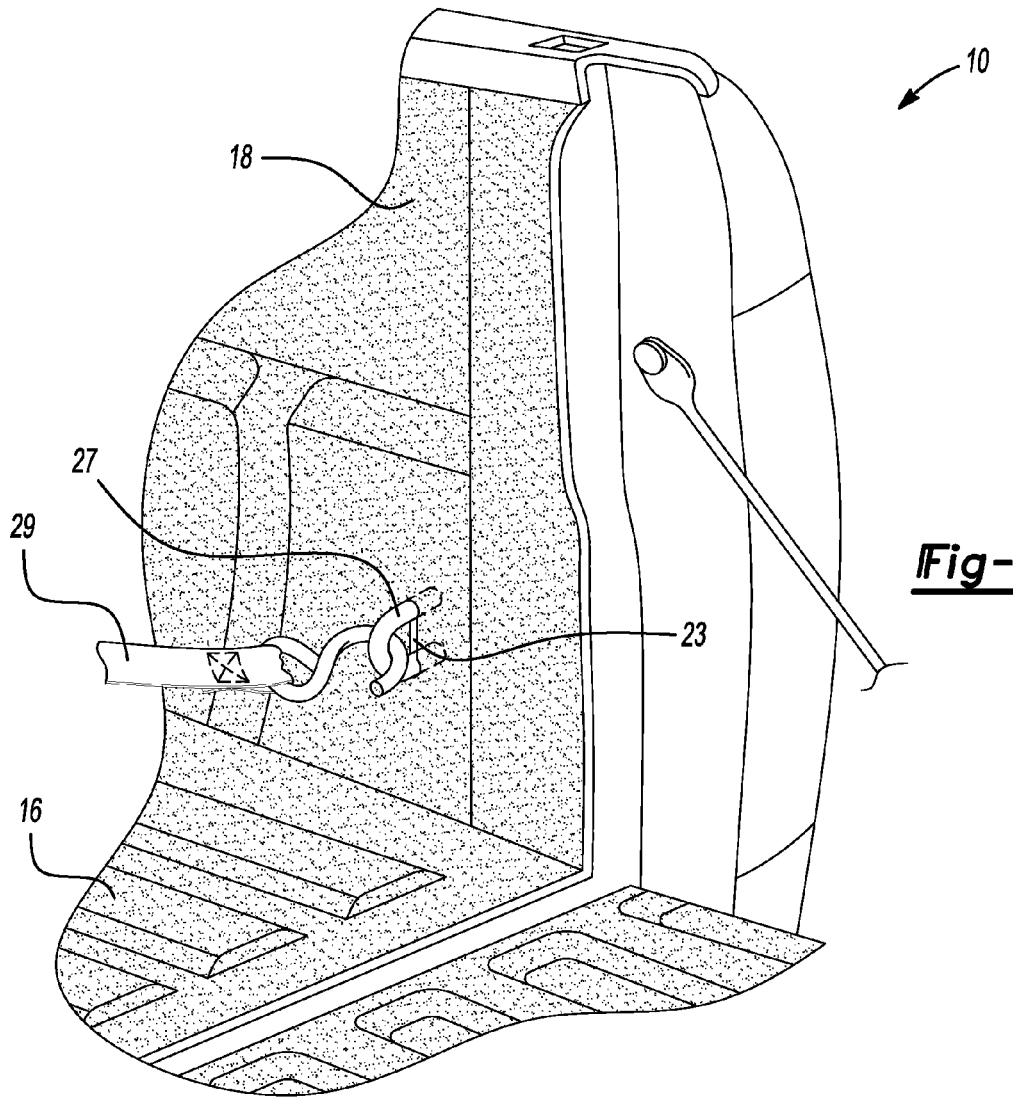
FIG. 3 is an enlarged perspective view illustrating a vehicle employing the removable cargo liner according to the principles of the present teachings.

As may be seen in FIGS. 1-3, base panel 16, side panels 18, 18', front panel 20, and rear panel 22 can each include a molded area 24 to accommodate features in the cargo box of the vehicle, such as the structure of the wheel well, corrugated floor panel, structural ribs, or other contoured features common in conventional cargo boxes. That is, it should also be appreciated that in some embodiments, each panel, 16, 18, 18', 20, and 22 can be shaped to closely conform to the corresponding topography of the cargo box panel. For example, panels 16, 18, 18', 20, and 22 can each comprise molded or otherwise shaped portions corresponding to corrugated ribs along the floor structure of cargo box 12, styling features formed upon the tailgate of the vehicle, or manufacturer logos. In this regard, removable cargo liner 10 can naturally and cleaning fit a particular cargo box shape or, conversely, be made generically to fit merely a cargo box size. It should be appreciated that the topographical appearance of removable cargo liner 10 can vary as desired. In some embodiments, such forming of panels 16, 18, 18', 20, and 22 can be done using a thermal molding process. In this regard, the panels can be assembled into one or more layers and then placed in a thermally-conducive mold cavity. The mold cavity can be shaped to conform to the corresponding shape of cargo box 12, which is both aesthetically pleasing and efficient at transferring loading forces between the cargo and cargo box 12. Heat and/or pressure can be applied to the panel to permanently deform or shape the panel (in some embodiments, this is completed through plastic deformation).

Moreover, as seen in FIG. 3, removable cargo liner 10 can comprise various through-holes 23 formed therein to permit retaining features 25 of cargo box 12 to extend through removable cargo liner 10. For example, as illustrated, tether hook 27 of cargo box 12 can extend through through-hole 23 of removable cargo liner 10 to permit a tether strap 29 to be connected thereto for retaining cargo within cargo box 12.

Figure 4:
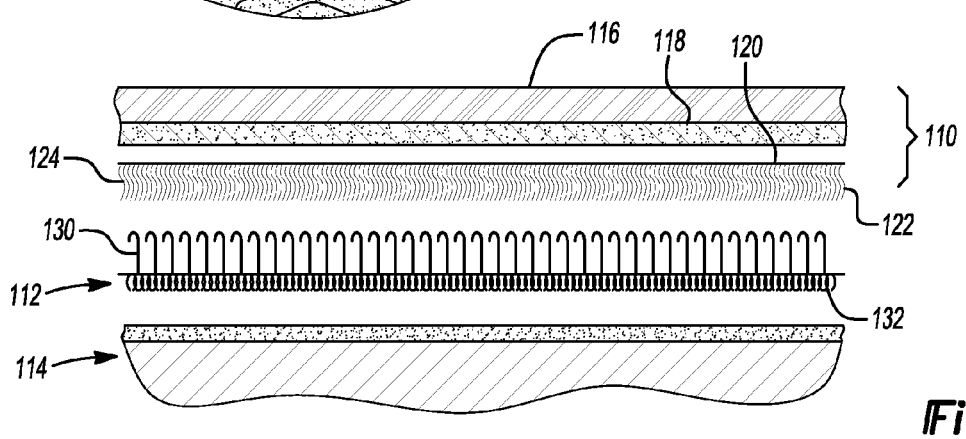
FIG. 4 is a schematic cross-sectional view illustrating the removable cargo liner according to the principles of the present teachings.

Referring now to FIG. 4, in some embodiments, removable cargo liner 10 can comprise a multi-layer assembly. In some embodiments, removable cargo liner 10 can comprise an upper multi-layer assembly 110 coupled to a double-sided hook and loop member 112 that is releasably connectable to a single-sided hook member 114 connected to cargo box 12. It should also be appreciated that, in some embodiments, removable cargo liner 10 can comprise an upper multi-layer assembly 110 releasably and directly connectable to single-sided hook member 114 connected to cargo box 12.

In some embodiments, upper multi-layer assembly 110 can comprise a upper (finish) layer 116 bonded or otherwise coupled to an intermediate layer 118, such as a water-proof, closed cell foam and/or compliant member. It should be understood, by way of non-limiting example, that intermediate layer 118 can comprise a polypropylene foam. Intermediate layer 118 can provide a cushioning response between cargo placed in cargo box 12 and the existing structure of cargo box 12. In this way, the likelihood of permanent damage to cargo box 12, if cargo is dumped or dropped, can be reduced. In some embodiments, upper layer 116 is coupled to intermediate layer 118 using flame bonding, whereby heat is applied to one or more of upper layer 116 and intermediate layer 118 to defining or created a bonded interface therebetween according to known processes. It should also be appreciated that upper layer 116 can be coupled to intermediate layer 118 using adhesive bonding or other methods. As a brief aside, it should also be appreciated that lower layer 120 can be coupled to intermediate layer 118 and/or upper layer 116 through a similar process of flame and/or adhesive bonding.

In some embodiments, upper multi-layer assembly 110 can further comprise a lower locking layer 120, such as soft, flexible, and pliable carpeting, adhesively coupled or bonded to intermediate layer 118 or directly to upper layer 110. As seen in FIG. 4, lower locking layer 120 can be oriented such that the loops or nap 122 thereof extend along an underside 124 of upper multi-layer assembly 110. In some embodiments, lower locking layer 120 can span all of or a substantial portion of underside 124 of upper multi-layer assembly 110. In this regard, nap 122 of lower locking layer 120 is generally adjacent and in contact with at least a portion of the interior painted surfaces of cargo box 12. In some embodiments, the soft nature of lower locking layer 120 can minimize the likelihood of abrasive contact between removable cargo liner 10 and cargo box 12. In some embodiments, lower locking layer 120 can be replaced by a woven or non-woven carpet, a hook material, or any low abrasive material, such as felt and the like, so long as it provides suitable locking response with double-sided hook and loop member 112 or single-sided hook member 114.

In some embodiments, upper layer 116 can be made of a Thermoplastic Olefin (TPO), a Thermoplastic Rubber (TPR), a composite thereof, plastic, a mat, woven or non-woven carpeting, or other material suitable for use in the intended application and environment. In some embodiments, upper layer 116 can comprise a viewable design either printed, molded, or otherwise formed in upper layer 116 (such as a team logo, manufacturer logo, or the like).

In some embodiments, double-sided hook and loop member 112 comprises an upper portion 130 having a first locking surface and a lower portion 132 having a second locking surface. In some embodiments, first locking surface of upper portion 130 defines a high-tenacity, low-cycle life, hook profile. This high-tenacity, low-cycle life, hook profile is complementary to lower locking layer 120, specifically loops or nap 122. In this way, upper multi-layer assembly 110 can be joined to upper portion 130 of double-sided hook and loop member 112 to effect a strong and reliable first bonding connection. Because of the high-tenacity, the locking connection between upper multi-layer assembly 110, specifically loops or nap 122, is strong and generally difficult to separate. Although it defines a low-cycle life, meaning it can not readily be separated without experiencing a decrease of locking strength, it is intended to generally remain attached to upper multi-layer assembly 110.

Similarly, in some embodiments, second locking surface of lower portion 132 of double-sided hook and loop member 112 defines a high-cycle life, low-tenacity, loop profile. This high-cycle life, low-tenacity, loop profile is complementary to single-sided hook member 114. In this way, double-sided hook and loop member 112 (together with upper multi-layer assembly 110) can be joined to single-sided hook member 114 to effect a somewhat weaker, yet reliable, second bonding connection. This second bonding connection is not as strong as the first bonding connection between double-sided hook and loop member 112 and upper multi-layer assembly 110, therefore when a separating force is applied to upper multi-layer assembly 110, it is highly likely the second bonding connection will separate. In other words, because of the low-tenacity, the locking connection between double-sided hook and loop member 112 and single-sided hook member 114 is weaker and more easily separable. Conversely, the high-cycle life property that exists within this second bonding connection permits double-sided hook and loop member 112 to be repeatedly separated from single-sided hook member 114 without suffering from reduced locking strength.

As seen in FIG. 4, in some embodiments, single-sided hook member 114 can be directly coupled to cargo box 12. Specifically, single-sided hook member 114 can be adhesively applied to cargo box 12 to retaining removable cargo liner 10 thereto. With particular reference to FIG. 2, single-sided hook member 114 can be applied to cargo box 12 as a series of short strips 160, as a series of long strips 162, or a combination thereof. It is generally desirable to apply single-sided hook member 114 to at least the corners of the panels to ensure a clean and reliable connection to cargo box 12.

It should be appreciated from the foregoing, the connection of upper multi-layer assembly 110 to cargo box 12 is provided such that it eliminates the need to sew or glue the hook and loop fastener to upper multi-layer assembly 110. That is, in some embodiments, the present teachings provide a reliable first bonding connection between the double-sided hook and loop member 112 and the upper multi-layer assembly 110 that is generally difficult to break. Conversely, the present teachings further provide a reliable second bonding connection between the double-sided hook and loop member 112 and the single-sided hook member 114, which is adhesively applied to the cargo box 12, that is more easily separated to provide quick and convenient removal and insertion of the removable cargo liner 10, without diminished retaining performance.

In some embodiments, double-sided hook and loop member 112 can be eliminated, such that upper multi-layer assembly 110 is selectively connectable directly to single-sided hook member 114. In some embodiments, lower locking layer 120 of upper multi-layer assembly 110 defines a high-cycle life, low-tenacity, loop profile. This high-cycle life, low-tenacity, loop profile is complementary to single-sided hook member 114. In this way, upper multi-layer assembly 110 can be directly joined to single-sided hook member 114 to effect a reliable, third bonding connection. This third bonding connection is not as strong as the first bonding connection of the earlier embodiment between double-sided hook and loop member 112 and upper multi-layer assembly 110, and can be generally equivalent to the previously described second bonding connection. Thus, third bonding connection can comprise high-cycle life properties that permit upper multi-layer assembly 110 to be repeatedly separated from single-sided hook member 114 without suffering from reduced locking strength.

It should be appreciated from the foregoing, the connection of upper multi-layer assembly 110 to cargo box 12 is provided such that it eliminates the need to sew or glue the hook and loop fastener to upper multi-layer assembly 110. That is, in some embodiments, the present teachings provide a reliable first bonding connection between the double-sided hook and loop member 112 and the upper multi-layer assembly 110 that is generally difficult to break. Conversely, the present teachings further provide a reliable second bonding connection between the double-sided hook and loop member 112 and the single-sided hook member 114, which is adhesively applied to the cargo box 12, that is more easily separated to provide quick and convenient removal and insertion of the removable cargo liner 10, without diminished retaining performance.

It should also be noted, however, that variations exist within the scope of the present teachings in terms of the specific combination of hook sides and loop sides for locking layer 120, optional double-sided hook and loop member 112, and single-sided hook member 114. That is, in some embodiments, double-sided hook and loop member 112 could be a double-sided hook member, a double-sided loop member, or define a reverse orientation compared to that specifically described herein. Likewise, locking layer 120 and single-sided hook member 114 could define a reverse orientation, such that locking layer 120 generally includes hook features and/or single-sided hook member 114 includes loop features. Moreover, as described, single-sided hook member can be directly coupled to locking layer 120 of upper multi-layer assembly 110. Still further, it should be understood that upper multi-layer assembly 110, together with double-sided loop member 112, can be coupled to a carpeted cargo area of a vehicle or trailer. In this regard, double-side loop member 112 can comprise hook features along lower portion 132 to engage with the loop features of the existing carpeted area. Still further, locking layer 120 could be formed with hook features to similarly directly engage the loop features of the existing carpeted area without the need for double-sided member 112.

According to the principles of the present teachings, each of the panels of removable cargo liner 10 of the present teachings is separate from the remaining panels and are not directly joinable therewith. In this regard, each of the panels is easily removable and manage by an individual user and conveniently storable. However, it should be appreciated that in some embodiments each of the panels can be joined together using a fastening system, such as hook and loop fasteners, zippers, and the like.

It should be understood that while removable cargo liner 10 shown in FIG. 1 includes all of the panels 16, 18, 18', 20, 22, not all of the panels need be present. For example, the user may elect to use only the base panel 16, or he may elect to use the base panel 16 only in conjunction with the front panel 20. Each of the panels 16, 18, 18', 20, 22 is removable from the other and is individually attached to the cargo box 12 by locking system described herein.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A removable cargo liner assembly for use in a cargo area, said removable cargo liner comprising:
    an upper multi-layer cargo liner assembly having a lower layer defining one of a hook and a loop feature, said upper multi-layer cargo liner being positionable in the cargo area of a vehicle;
    a single-sided member connectable to the cargo area defining one of a hook and a loop feature; and
    a double-sided intermediate member having a first portion and an opposing second portion, said first portion having one of a loop and a hook feature complementary to said lower layer to define a first releasable bonding connection, said second portion having one of a loop and a hook feature complementary to said single-sided member to define a second releasable bonding connection,
    wherein said first releasable bonding connection is more difficult to separate than said second releasable bonding connection.

2. The removable cargo liner according to claim 1 wherein said second releasable bonding connection can withstand greater joining-releasing cycles than said first releasable bonding connection.

3. The removable cargo liner according to claim 1 wherein said upper multi-layer cargo liner assembly comprises:
    an upper layer for supporting cargo; and
    a compliant intermediate layer fixedly coupled between said upper layer and said lower layer.

4. The removable cargo liner according to claim 3 wherein said upper layer is a composite layer.

5. The removable cargo liner according to claim 3 wherein said upper layer is a TPO/TPR composite.

6. The removable cargo liner according to claim 3 wherein said compliant intermediate layer is a water-proof, closed-cell foam.

7. The removable cargo liner according to claim 1 wherein said single-sided member is adhesively connectable to the cargo area.

8. A removable cargo liner for use in a cargo area, said removable cargo liner comprising:
    a plurality of separate and distinct cargo panels, each of said plurality of cargo panels having a multi-layer assembly having a lower layer defining one of a hook and a loop feature, each of said plurality of cargo panels being sized to be positioned within the cargo area of a vehicle or trailer;
    a single-sided member connectable to the cargo area defining one of a hook and a loop feature; and
    a double-sided intermediate member having a first portion and an opposing second portion, said first portion having one of a loop and a hook feature complementary to and joinable with said lower layer to define a first releasable bonding connection, said second portion having one of a loop and a hook feature complementary to and joinable with said single-sided member to define a second releasable bonding connection,
    wherein said first releasable bonding connection has a higher tenacity than said second releasable bonding connection.

9. The removable cargo liner according to claim 8 wherein said second releasable bonding connection can withstand greater joining-releasing cycles than said first releasable bonding connection.

10. The removable cargo liner according to claim 8 wherein each of said plurality of panels comprises:
    an upper layer; and
    a compliant intermediate layer fixedly coupled between said upper layer and said lower layer.

11. The removable cargo liner according to claim 10 wherein said upper layer is a composite layer.

12. The removable cargo liner according to claim 10 wherein said upper layer is a TPO/TPR composite.

13. The removable cargo liner according to claim 10 wherein said compliant intermediate layer is a water-proof, closed-cell foam.

* * * * *